(12) United States Patent
Schultz

(10) Patent No.: US 6,908,212 B2
(45) Date of Patent: Jun. 21, 2005

(54) FLOURESCENT LIGHT FIXTURE

(76) Inventor: Michael Schultz, c/o Capital Lighting Corporation 199 Advanced Blvd. Suite 202, Brampton, Ontario (CA), L6T 4N2

(*) Notice: Subject to any disclaimer, the term of this patent is extended or adjusted under 35 U.S.C. 154(b) by 0 days.

(21) Appl. No.: 10/365,457

(22) Filed: Feb. 13, 2003

(65) Prior Publication Data

US 2004/0160766 A1 Aug. 19, 2004

(51) Int. Cl.[7] .................................................. F21S 4/00
(52) U.S. Cl. .................. 362/217; 362/239; 362/240; 362/241; 362/243; 362/226; 362/245; 362/233; 362/297; 362/296; 362/341; 362/346; 362/319; 362/280; 362/277
(58) Field of Search ................................ 362/217, 260, 362/239, 240, 241, 243, 245, 226, 233, 297, 296, 341, 346, 319, 280, 277

(56) References Cited

U.S. PATENT DOCUMENTS

| | | | | |
|---|---|---|---|---|
| 5,195,822 A | * | 3/1993 | Takahashi et al. | 362/296 |
| 5,440,470 A | * | 8/1995 | Ly | 362/341 |
| 6,024,468 A | * | 2/2000 | Kassay et al. | 362/260 |

* cited by examiner

*Primary Examiner*—Sandra O'Shea
*Assistant Examiner*—Bertrand Zeade
(74) *Attorney, Agent, or Firm*—Ridout & Maybee LLP

(57) ABSTRACT

A fluorescent light fixture is provided for retrofitting light fixtures utilizing conventional fluorescent lamps into light fixtures utilizing energy efficient fluorescent lamps. The fluorescent light fixture is a single unit comprising a reflector, socket plates at each end, lamp sockets, ballast, ballast cover and wiring. The reflector may be slidably mounted onto the socket plates to allow the retrofit to expand and contract. The fluorescent light fixture may include a attachment which temporarily secures the fluorescent light fixture within a light fixture shell.

5 Claims, 11 Drawing Sheets

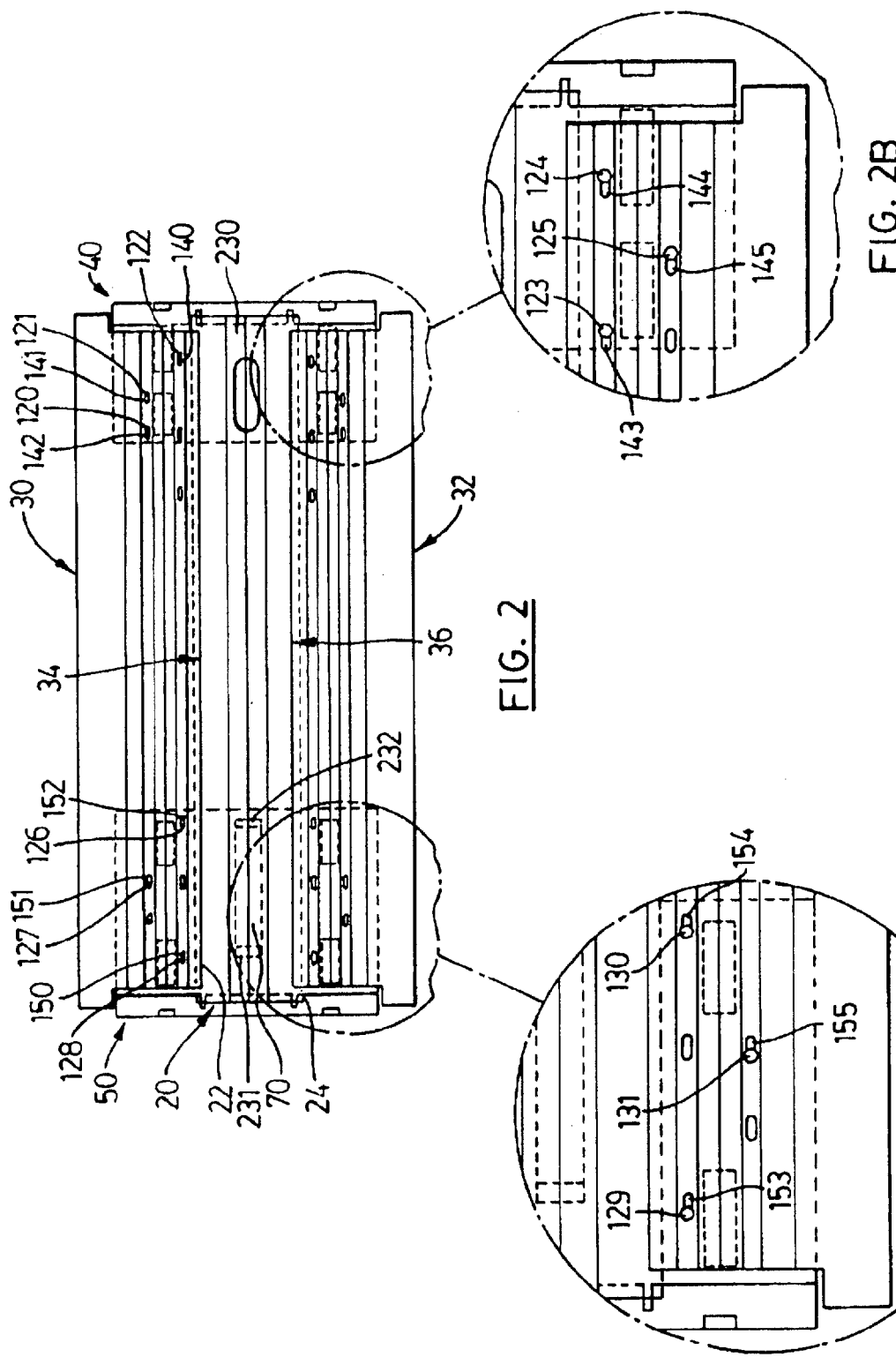

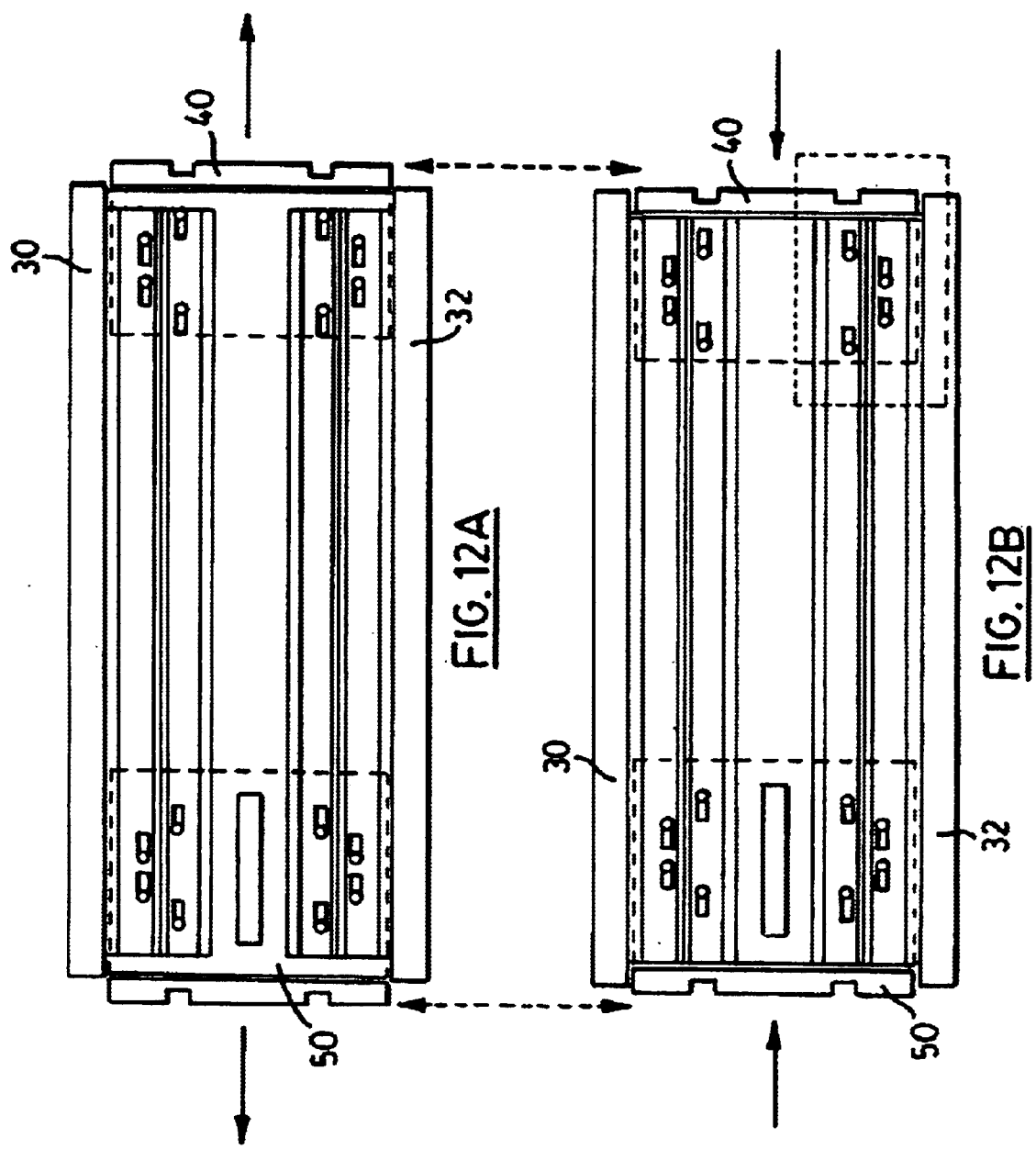

FLOURESCENT LIGHT FIXTURE

FIELD OF THE INVENTION

This invention relates to light fixtures and more particularly to a fluorescent light fixture which retrofits a fixture which uses conventional fluorescent lamps with a fixture which uses high energy efficient fluorescent lamps and ballasts.

BACKGROUND OF THE INVENTION

Fluorescent light fixtures are widely used in industrial, commercial, retail, institutional and office applications. Older model light fixtures generally employ T12 fluorescent lamps and magnetic ballasts whereas newer models employ high efficiency T8 fluorescent lamps and electronic ballasts. The use of T8 technology represents a significant improvement over T12 technology in terms of both energy efficiency (up to 40% increase) and illumination efficiency (up to 25% increase). T8 fluorescent lamps also last 20% longer compared to T12 fluorescent lamps.

One way to reduce the high operating and maintenance costs associated with older model fluorescent light fixtures is simply to replace them with newer, more efficient models. However, given the number of fixtures that would ordinarily require replacement, this solution may not be cost effective.

The cost associated with the replacement of older fluorescent light fixtures can be reduced through retrofitting. Retrofitting involves replacing only certain parts of an existing fluorescent lighting fixture, while retaining the remainder of the fixture housing.

A common retrofit is the conversion of a four T12 lamp fixture into a two T8 lamp fixture. Typically this involves numerous steps: (1) installing an electronic ballast into the fixture, (2) wiring the ballast to each of four sockets, (3) installing each socket into individual socket brackets, (4) screwing the socket brackets into the fixture, (5) connecting the power supply (6) installing right and left reflector covers and (7) installing a ballast cover. Retrofit kits are widely available for this purpose and other types of conversions. However, these retrofit kits suffer from a variety of problems.

The installation of retrofit kits can be time consuming, cumbersome and costly. Using currently available retrofit kits, it typically takes 30 minutes to convert a single light fixture. The installer must connect the retrofit kit to the existing light fixture while standing on a ladder and holding the retrofit kit in place. This awkwardness increases the effort and skill required for the installation and the inspection of individual components and also contributes to physical fatigue. There are also safety concerns arising from working on a ladder for a significant period of time. These factors limit the number of retrofit kits which can be installed at any one time by an installer.

Thus, an improved retrofit kit for a fluorescent light fixture is needed not only for reducing operating, maintenance and replacement costs, but also for easing installation and inspection.

Accordingly, it is an object of the present invention to provide an improved fluorescent light fixture retrofit kit for converting light fixtures utilizing conventional fluorescent lamps and ballasts to light fixtures utilizing energy efficient fluorescent lamps and ballasts.

It is another object of the present invention to provide a fluorescent light fixture retrofit kit which can be installed in a cost effective and timely manner.

It is another object of the present invention to provide a fluorescent light fixture retrofit kit which is constructed from a minimal amount of material and is light weight.

It is another object of the present invention to provide a fluorescent light fixture retrofit kit eliminates the need to assemble a significant number of components.

It is another object of the present invention to provide a fluorescent light fixture retrofit kit which does not require the user to hold the kit in place during installation.

It is another object of the present invention to provide a fluorescent light fixture retrofit kit which is adjustable in size to allow ease of installation of a preassembled kit.

SUMMARY OF THE INVENTION

An object of the present invention is to provide an improved fluorescent light fixture retrofit kit related to adapting older model fluorescent lighting fixtures to use high efficiency fluorescent lamps and ballasts.

In accordance with one aspect of the present invention, there is provided a fluorescent light fixture comprising: a first socket plate having a top surface and a bottom surface; a second socket plate having a top surface and a bottom surface; a lamp socket mounted on bottom surface of each of the first and second socket plates; and a reflector mounted on the bottom surface of each of the first and second socket plate wherein the first and second socket plates are located at opposite ends of the reflector.

In an embodiment of the present invention, the fluorescent light fixture comprises a pair of reflectors.

In another embodiment of the present invention, the fluorescent light fixture further comprises: a ballast mounted on the top surface of the second socket plate; a first set of electrical wires connected to the ballast; a second set of electrical wires connected to the ballast; a third set of electrical wires connected to the ballast and wherein the ballast is electrically connected to the lamp sockets with the first set of electrical wires and the second set of electrical wires.

In another embodiment of the present invention, the fluorescent light fixture further comprises a ballast cover.

In another embodiment of the present invention there is provided a fluorescent light fixture comprising a first socket plate having a top surface and a bottom surface, a second socket plate having a top surface and a bottom surface, a lamp socket mounted on bottom surface of each of the first and second socket plates, a reflector mounted on the bottom surface of each of the first and second socket plate wherein the first and second socket plates are located at opposite ends of the reflector and wherein the reflector is attached to the first socket plate such that it is slidable in relation to the socket plates.

The invention also provides a fluorescent light fixture comprising a first socket plate having a top surface and a bottom surface, the first socket plate having a slot therein, a second socket plate having a top surface and a bottom surface, a lamp socket mounted to the bottom surface of the first and second socket plates, a reflector having a hole therein, the hole alignable with the slot, and the reflector is fastened to the bottom surface of each of the first socket plate and the second socket plate, wherein the first and second socket plate are located at opposite ends of the reflector and a rod extending through the hole and the slot, wherein the first socket plate is slidable in relation to the reflector.

In an embodiment, the second socket plate has a second slot therein and a rod passes through the second hole in the reflector and the second slot in the second socket plate and the second socket plate is slidable in relation to the reflector. The rods may be rivets.

The invention also provides a fluorescent light fixture comprising a first socket plate having a top surface and a bottom surface, the first socket plate having a hole therein, a second socket plate having a top surface and a bottom surface, a lamp socket mounted to the bottom surface of the first and second socket plates, a reflector having a slot therein, the slot alignable with the hole, the reflector fastened to the bottom surface of each of the first socket plate and the second socket plate, wherein the first and second socket plate are located at opposite ends of the reflector, and a rod extending through the hole and the slot, wherein the first socket plate is slidable in relation to the reflector.

The invention also provides a fluorescent fixture comprising a first socket plate, the first socket plate having a top surface and a bottom surface, a second socket plate, the second socket plate having a top surface and a bottom surface, a lamp socket mounted on the bottom surface of at least one of the first and second socket plates, an attachment for attaching the fixture to a surface, the attachment mounted on the top surface of the first socket plate, and a reflector mounted on the bottom surface of each of the first and second socket plate.

The attachment may be a releasable attachment. The attachment may be a hook and loop fastener with adhesive outer surfaces, a dual loop fastener with adhesive outer surfaces, a magnet, or a magnet with an adhesive outer surface.

In another embodiment, the attachment may be mounted on the top surface of the first second socket plate. In another embodiment, there may be a plurality of attachments mounted on the top surface of the first and second socket plate. In a further embodiment, the socket plate is slidable in relation to the reflector.

The invention also provides a fluorescent fixture comprising: a first socket plate; having a top surface and a bottom surface and a plurality of screw holes therein; a second socket plate having a top surface and a bottom surface and a plurality of screw holes therein; and a reflector mounted on the bottom surface of each of the first and second socket plate wherein at least one said plurality of screw holes has a diameter narrower than the diameter of a screw for at least one screw hole.

An advantage of the present invention is that the reflector and the socket plates form the structural framework for the fluorescent light fixture. A separate housing is unnecessary. Another advantage of the present invention is that the fluorescent light fixture can expand and contract in length to allow ease of installation of the fluorescent light fixture into an existing fixture shell. Yet another advantage of the present invention is that fluorescent light fixture can be temporarily secured within an existing fixture shell using the attachment thereby freeing the installer from having to hold the fluorescent light fixture in place during installation or fastening or securing.

BRIEF DESCRIPTION OF THE FIGURES

FIG. 2 is a downward view, from the perspective of the user, of the fluorescent lighting fixture illustrating reflectors with a plurality of slots.

FIG. 2A is a detailed view of the slots and rivets in the reflectors and socket plates.

FIG. 2B is a detailed view of the slots and rivets in the reflectors and socket plates.

FIG. 12A is a downward view, from the perspective of the user, of the fluorescent lighting fixture In the extended position.

FIG. 12B is a downward view, from the perspective of the user, of tho fluorescent lighting fixture in the retracted position.

DETAILED DESCRIPTION

The invention is a fluorescent light fixture retrofit insert (hereinafter "retrofit") related to adapting older model fluorescent lighting fixtures to use high efficiency fluorescent lamps and ballasts.

Figure 1:
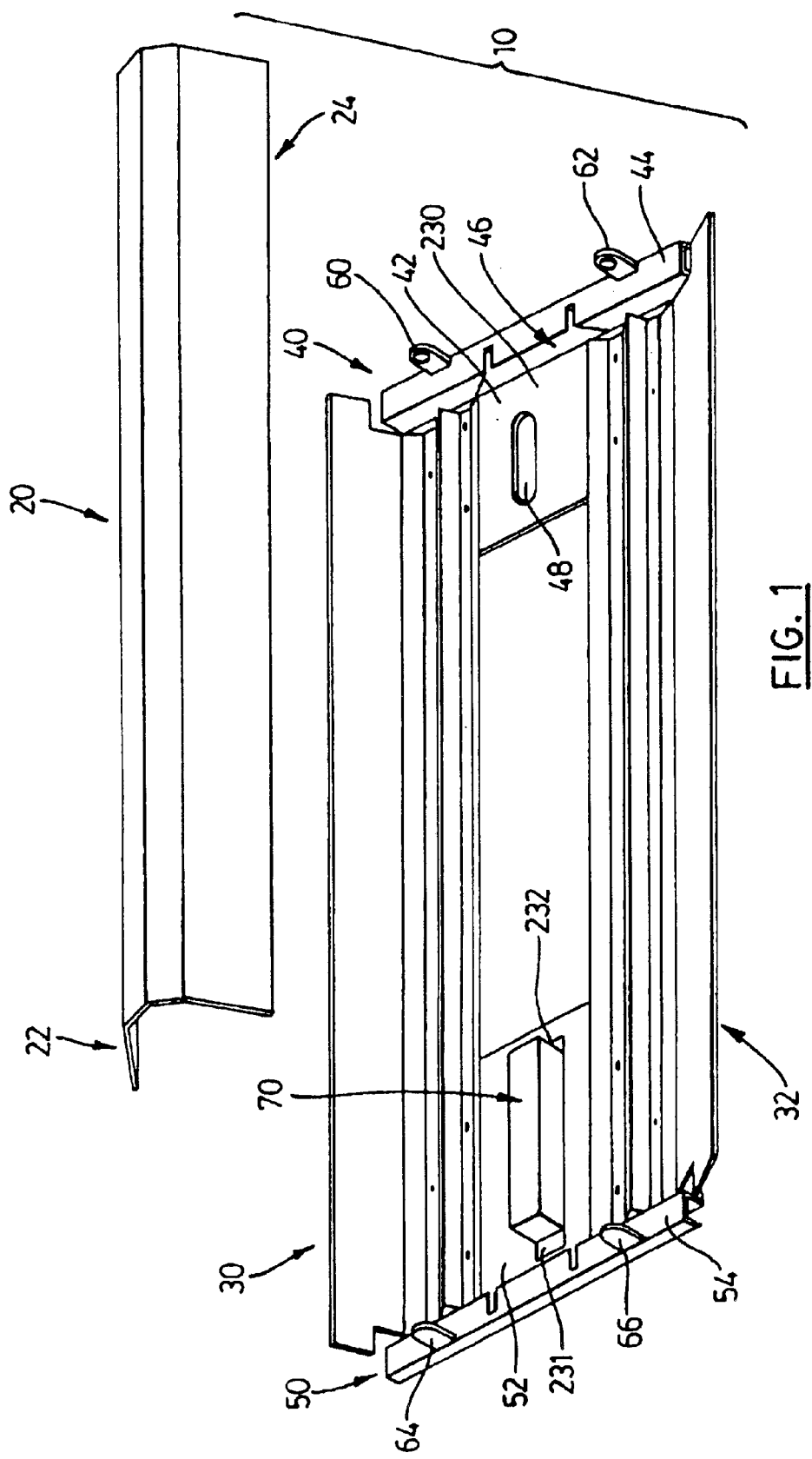
FIG. 1 is perspective view of the fluorescent lighting fixture, partially exploded.

As shown in FIG. 1, the retrofit 10 comprises a downwardly facing ballast cover 20 and reflectors 30 and 32 on either side thereof. The ballast cover 20 and reflectors 30 and 32 are mounted on a first socket plate 40 and a second socket plate 50 located at opposite ends of the ballast cover 20 and reflectors 30 and 32. As will be understood by those knowledgeable in the art, the socket plates 40 and 50 and the reflectors 30 and 32 are typically spaced apart to fit a 2'×4' fluorescent lighting fixture shell for T8 lamps. The retrofit can be adapted to fit lighting fixture sizes of varying sizes. For example, 8' T12 lamps can be replaced by two sets of 4' T8 lamps. Other examples include 2', 3' and 4' fixture lengths.

In this embodiment, the retrofit 10 comprises a rectangular structure formed by the reflectors 30 and 32 and the first and second socket plates, 40 and 50. For the purposes of clarity, "down" or "lower" or "bottom" shall refer to a direction away from the ceiling and towards the floor, while "up" or "upper" or "top" shall refer to the opposite direction.

The retrofit 10 is installed in an empty fluorescent lighting fixture shell located in a ceiling with reflectors 30 and 32 facing downward.

A feature common to all prior art light fixtures is a housing within which reflectors, lamp sockets, socket brackets, ballast and wiring are mounted. Typically, such housing is in the form of an open bottom rectangular container or shell.

With the retrofit 10, a separate housing is unnecessary since the reflectors 30 and 32 and the socket plates 40 and 50 provide the requisite structural framework. As such the retrofit is an improvement over prior art light fixtures since less material is needed to manufacture the retrofit compared to prior art light fixtures. Consequently the retrofit can be produced less expensively. In addition the lack of a housing results in a retrofit which is lighter in weight compared to prior art light fixtures.

As shown in FIG. 1, the first socket plate 40 comprises a rectangular base 42 and an upwardly extending flange 44 attached to one edge of the base 42. The second socket plate 50 also comprises a rectangular base 52 and an upwardly extending flange 54 attached to one edge of the base 52.

A plurality of lamp sockets 60, 62, 64 and 66 adapted for use with high efficiency fluorescent lamps are mounted on each of flange 44 and 54. The socket plates 40 and 50 can be fashioned out of light metal or other suitable material. As illustrated in FIG. 1, the retrofit 10 as shown can receive two fluorescent lamps. The retrofit can be adapted to receive a varying number of fluorescent lamps.

Figure 2C:
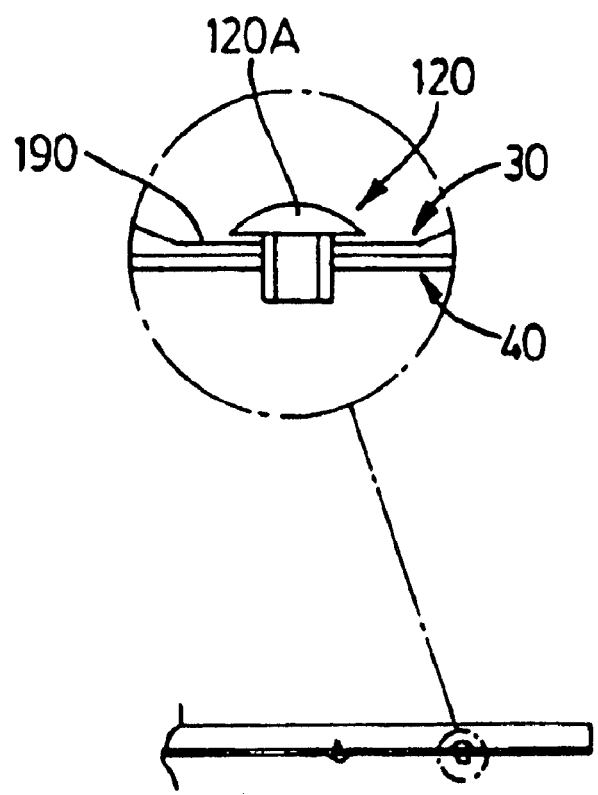
FIG. 2C is a detailed view of a single slot and a single rivet through the reflector and socket plate.
Figure 3:
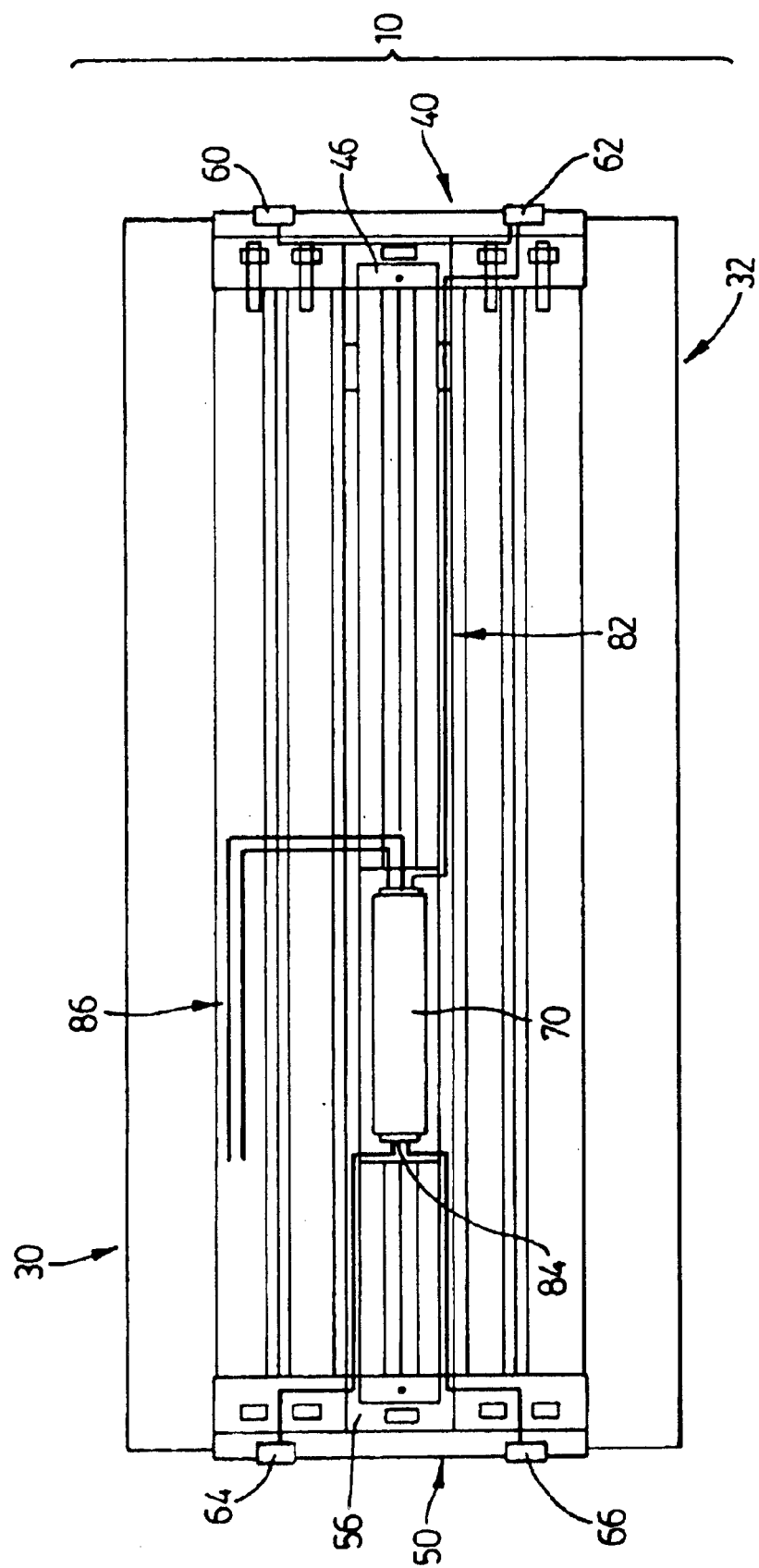
FIG. 3 is downward view, from the perspective of the user, of the fluorescent lighting fixture without the ballast cover illustrating the wiring between the ballast and the lamp sockets.

As shown in FIG. 1, the first socket plate 40 includes a plurality of wire openings 46 and 48. As shown in FIG. 3, the second socket plate 50 includes a wiring opening 56. As shown in FIG. 1 and FIG. 2, a ballast 70 is mechanically mounted on the lower side of the base 52 of the second socket plate 50.

As shown in FIG. 3, a first set of wiring 82, a second set of wiring 84 and a third set of wiring 86 is connected to the ballast 70. The first set of wiring 82 is led through the wiring opening 46 in the first socket plate 40 and used to electrically connect the ballast 70 with lamp sockets 60 and 62. The second set of wiring 84 is led through the wiring opening 56 in the second socket plate and used to electrically connect the ballast 70 with lamp sockets 64 and 66. The third set of wiring 86 leading from the ballast 70 is left unconnected and is used during installation of the retrofit 10, to wire the ballast 70 to a power source.

Figure 4:
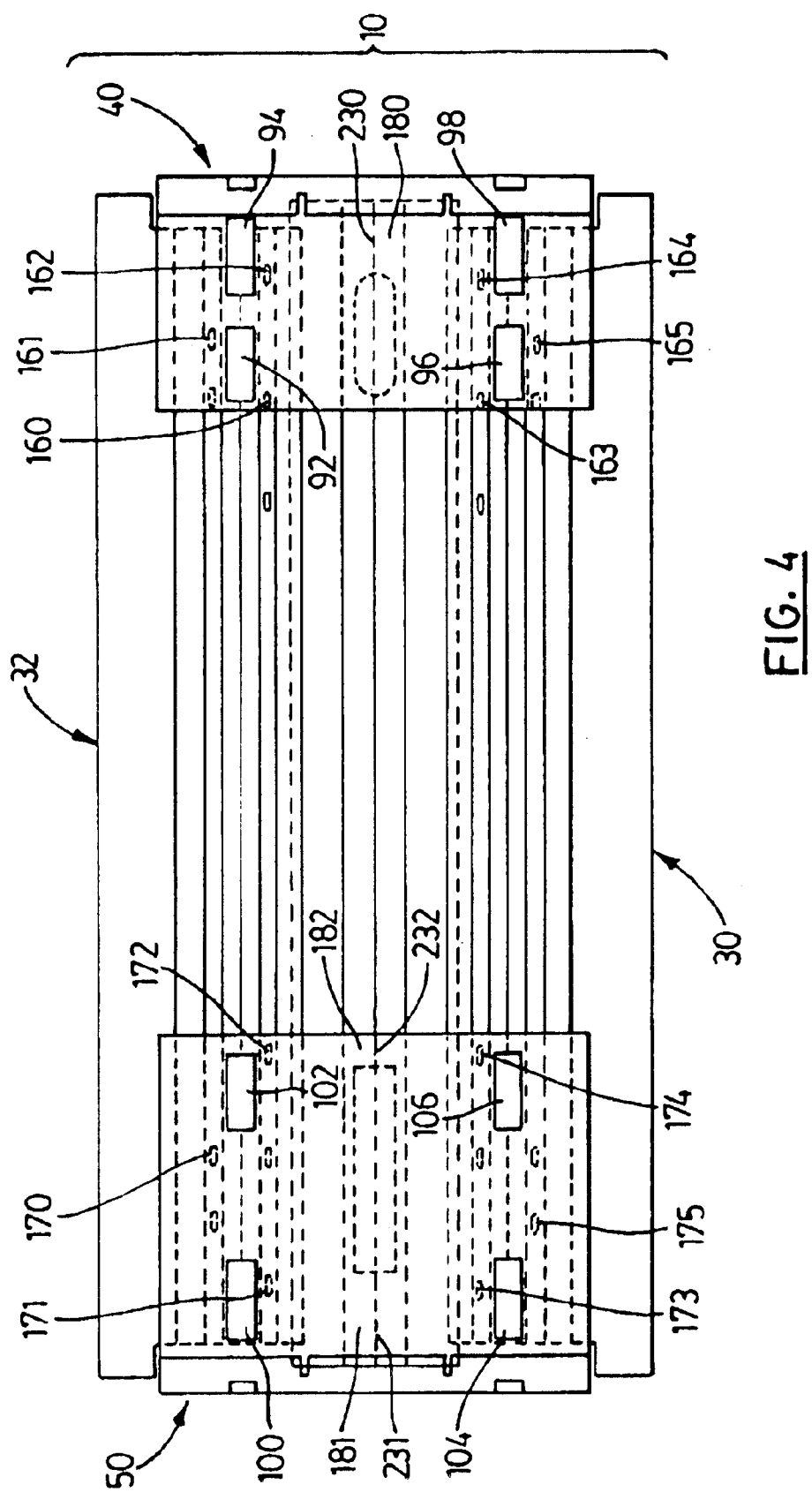
FIG. 4 is an underside view of the fluorescent lighting fixture illustrating socket plates with a plurality of slots.

As shown in FIG. 4, the first socket plate 40 and the second socket plate 50 have screw holes 230 and 231 and 232 respectively. In use, screws 180, 181 and 182 pass respectively through screw holes 230, 232, and 232 to attach the retrofit 10 to a fixture shell. Screws 180, 181 and 182 can also function to ground the installed retrofit 10.

Figure 8:
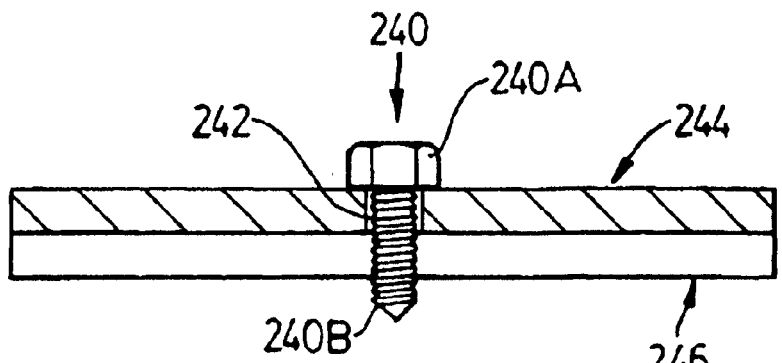
FIG. 8 is a detailed cross-sectional view of a portion of a prior art fluorescent lighting fixture in a housing.

In prior art light fixtures as illustrated in FIG. 8, an electrical ground is achieved by threading a screw 240 through a socket plate 244 and a fixture shell 246. This arrangement allows an electrical charge to pass through the screw 240 and wherever the screw 240 contacts the socket plate 244 and the fixture shell 246. However, this arrangement does not provide a confident electrical ground. Typically the surface of the socket plate 244 is electrically insulated with a coat of paint. Therefore, during the installation of the screw 240, it is necessary that the screw head 240A scratch off some of the paint on the socket plate 244 to allow an electrical charge to pass through the screw head 240A and into the socket plate. As such contact between the screw and the socket plate can be unreliable.

Figure 9:
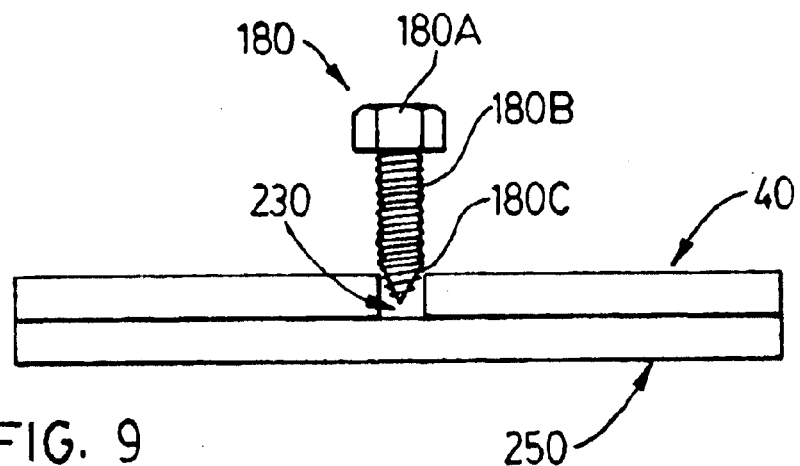
FIG. 9 is a cross-sectional view of a portion of the fluorescent lighting fixture in a housing illustrating a single screw and a single screw hole.
Figure 10:
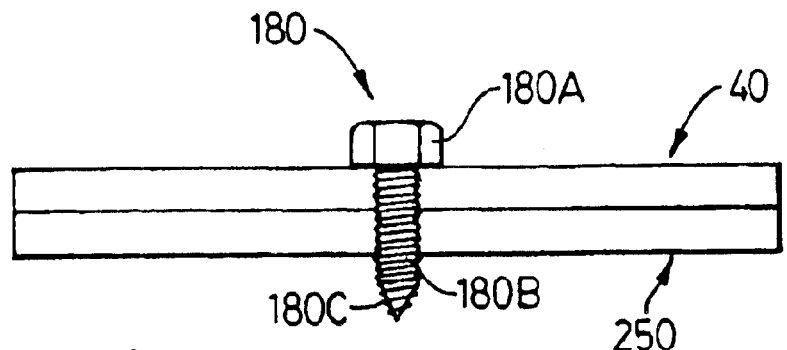
FIG. 10 is a cross-sectional view of a portion of the fluorescent lighting fixture in a housing illustrating a single screw engaged in screw hole.

The retrofit overcomes the grounding problems associated with prior art lighting fixtures by maximizing contact between screws 180, 181, and 182 and the first and second plates 40 and 50. In one embodiment, the screws 180, 181 and 182 are self-tapping screws. FIG. 9 illustrates screw 180 comprising a head 180A, a threaded shaft 180B and a tapping tip 180C. In use, screw 180 is forced through screw hole 230 which is smaller in diameter than the threaded shaft 180B of the screw 180. As seen in FIG. 10, as screw 180 is forced through screw hole 230, the screw hole 230 will break open further to the diameter of the threaded screw shaft 180B. The tapping tip 180C of the screw 180 will tear a hole through the fixture shell. Consequently, both the head 180A and the threaded shaft 180B of the screw have maximum contact with the socket plate 40 and the fixture shell.

Screws 181 and 182 interact with screw holes 231 and 232 in the same fashion as described above. Typically the difference in diameter between the screw holes 230, 231 and 232 in relation with screws 180, 181, and 182 will be 1 mm.

FIG. 1 shows a partially assembled retrofit 10 with the ballast cover 20 removed. The ballast cover 20 comprises a single piece of light metal or other suitable material. Typically the ballast cover 20 is bent into a parabolic structure and forms a reflective surface in conjunction with the reflectors described below. The ballast cover 20 is held in place by the reflectors 30 and 32. One longitudinal edge 34 of reflector 30 and one longitudinal edge 36 of reflector 32 is adapted to overlap longitudinal edges 22 and 24 of the ballast cover 20.

Figure 7:
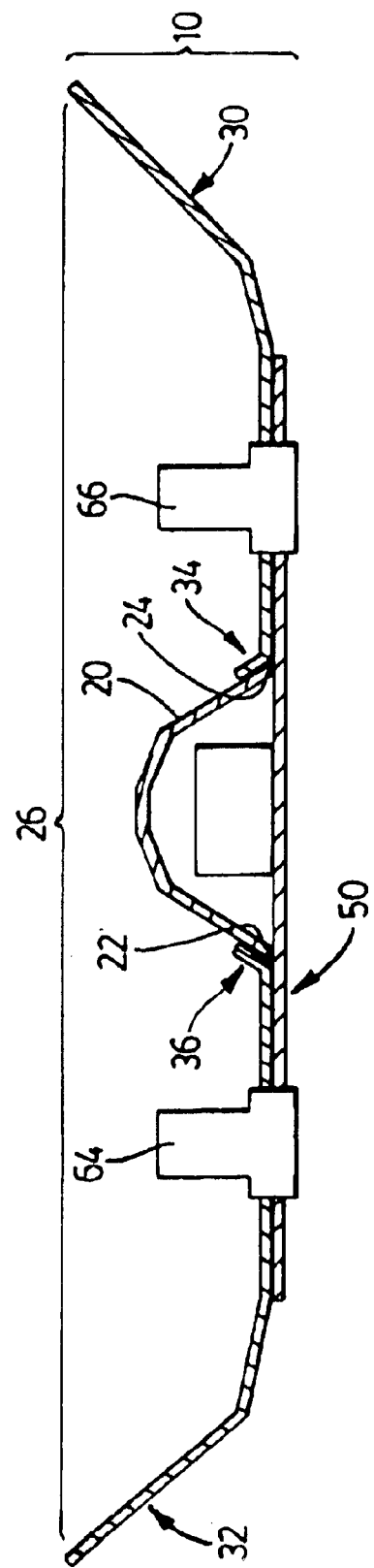
FIG. 7 is a cross-sectional view of the fluorescent lighting fixture.

FIG. 7 shows a cross-sectional view of the retrofit 10. As illustrated, each reflector 30 and 32 comprises a single rectangular piece of light metal or other suitable material. The reflectors 30 and 32 can take a number of configurations. Typically, each reflector 30 and 32 is bent to form a concave parabolic structure. The reflectors 30 and 32 are adapted to work together with the ballast cover 20, to form a reflective surface 26 which directs light emanating from fluorescent lamps installed inside the retrofit 10, downward into a room rather than upwards within the fixture. It will be appreciated that other types of reflectors can be used.

Figure 5:
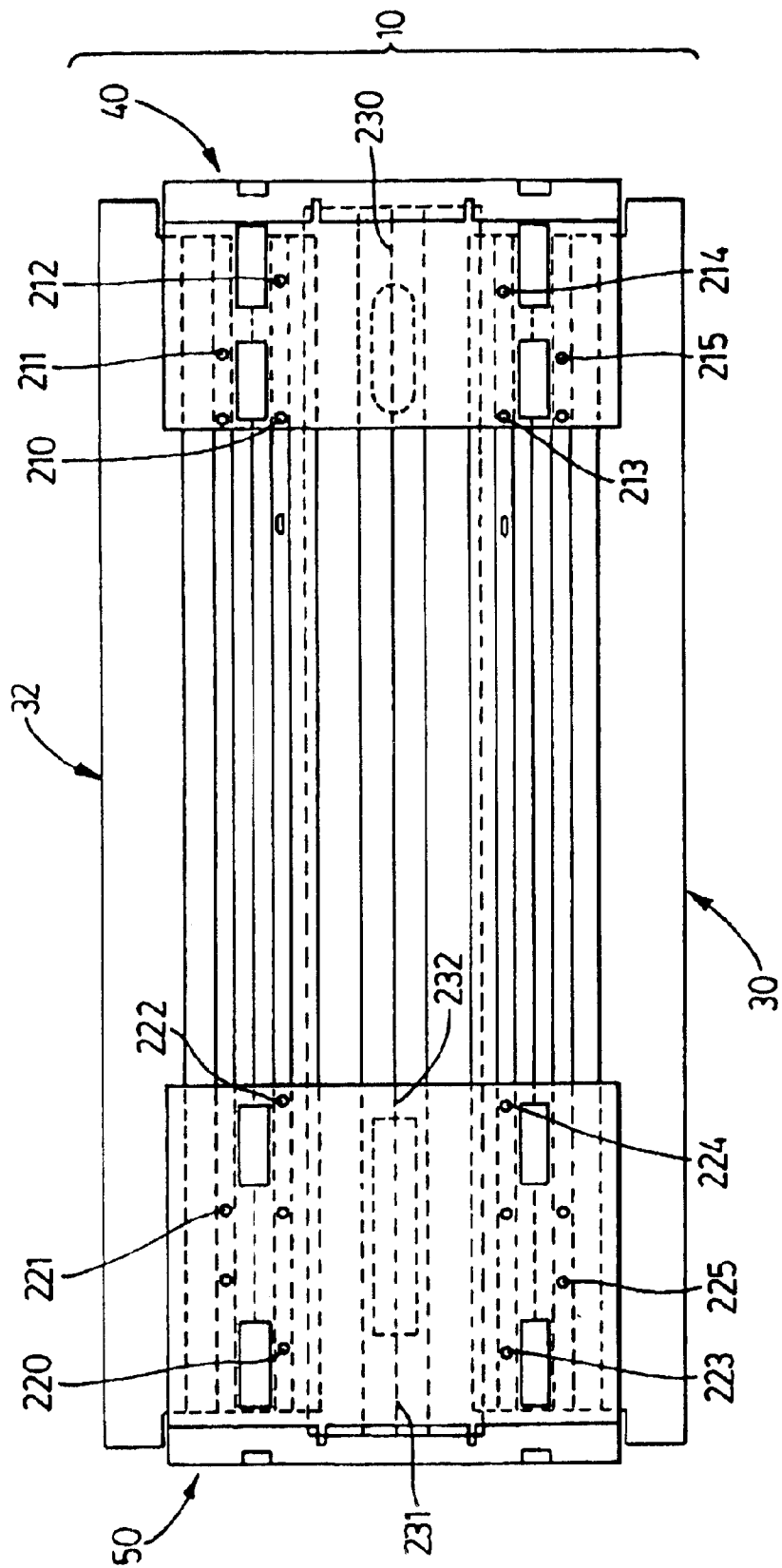
FIG. 5 is an underside view of the fluorescent lighting fixture illustrating socket plates with a plurality of holes.

Reflectors 30 and 32 are slidably mounted on the top surface of the first socket plate 40 and second plate 50. In a one embodiment, the reflectors 30 and 32 are slidably mounted on the bottom surface of the first socket plate 40 and second socket plate 50. As shown in FIG. 2 in this embodiment, reflectors 30 and 32 each have a plurality of slots 140, 141, 142, 150, 151, 152 and 143, 144, 145, 153, 154, 155 respectively. As shown in FIG. 5 the first socket plate 40 and the second socket plate 50 have a plurality of holes 210, 211, 212, 213, 214, 215 and 220, 221, 222, 223, 224, 225 respectively.

Reflector 30 is mounted on the first socket plate 40 and the second socket plate 50 such that the plurality of slots 140, 141, 142 and 150, 151, 152 (as shown in FIG. 2) in reflector 30 are substantially aligned with the plurality of holes 210, 211, 212 in the first socket plate 40 (as shown in FIG. 5) and the plurality of holes 220, 221, 222 in the second socket plate 50 respectively (as shown in FIG. 5).

Reflector 32 is mounted on the first socket plate 40 and the second socket plate 50 such that the plurality of slots 143, 144, 145 and 153, 154, 155 (as shown in FIG. 2) in reflector 30 are substantially aligned with the plurality of holes 213, 214, 215 in the first socket plate 40 (as shown in FIG. 5) and the plurality of holes 223, 224, 225 in the second socket plate 50 respectively.

As shown in FIG. 2 and FIG. 5, the reflectors 30 and 32 are slidably mounted on the first socket plate 40 and the second socket plate 50 by passing fasteners 120, 121, 122, 123, 124, 125, 126, 127, 128, 129, 130, 131 through slots 140, 141, 142, 143, 144, 145, 150, 151, 152, 153, 154, 155 and through holes 210, 211, 212, 213, 214, 215, 220, 221, 222,223, 224, 225 respectively.

Figure 6:
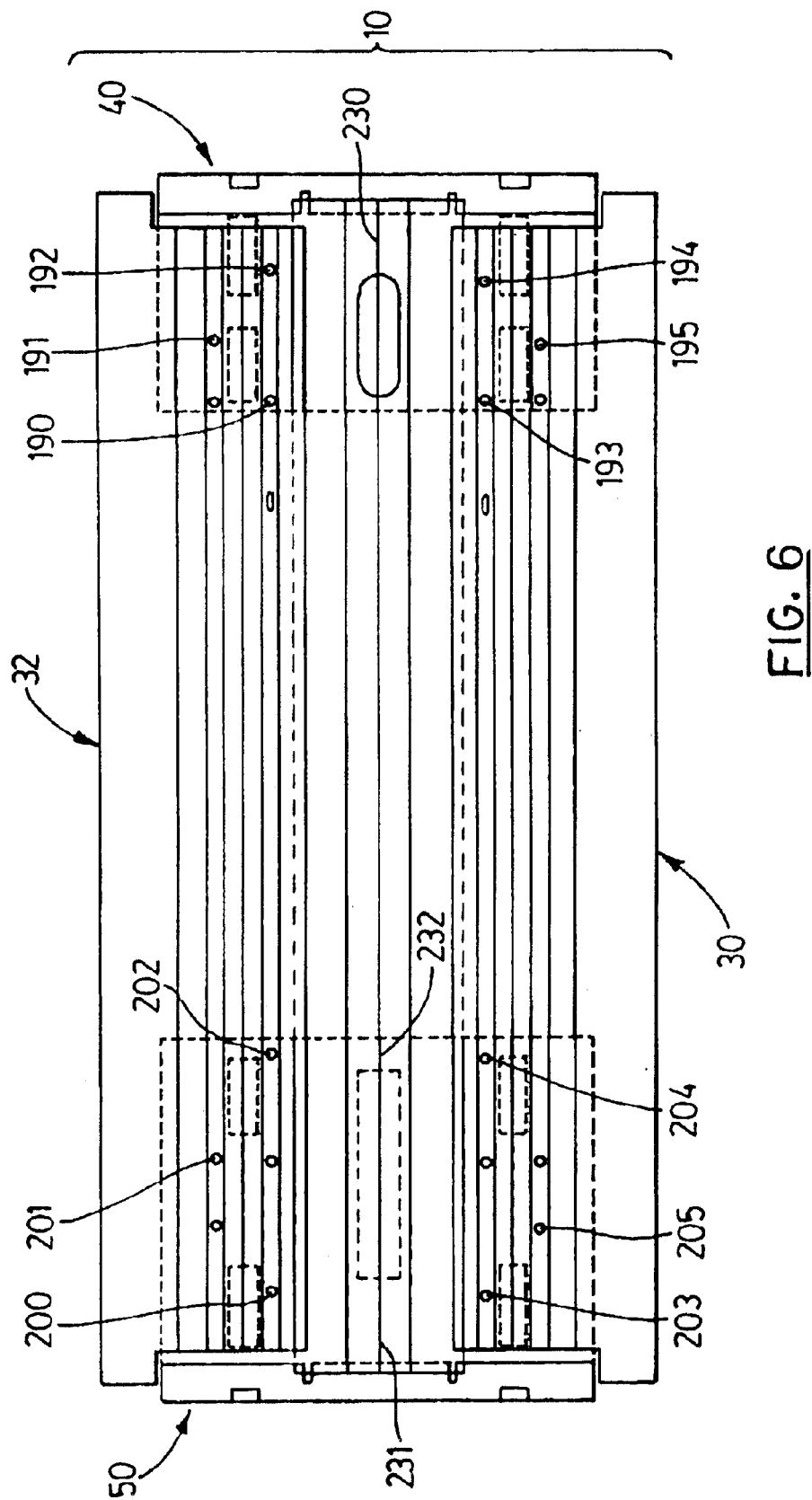
FIG. 6 is a downward view, from the perspective of the user, of the fluorescent lighting fixture illustrating reflectors with a plurality of holes.

In a second embodiment, the arrangement described above is reversed such that there is a plurality of slots 160, 161, 162, 163, 164, 165 and 170, 171, 172, 173, 174, 175, 176 in the first socket plate 40 and the second socket plate respectively (as shown in FIG. 4) and a plurality of holes 190, 191, 192, 200, 201, 202 and 193, 194, 195, 203, 204, 205 in reflector 30 and reflector 32 respectively (as shown in FIG. 6). Reflectors 30 and 32 are slidably mounted onto the bottom surface of the first socket plate 40 and the second socket plate 50 in the same fashion as described in the first embodiment.

Figure 11B:
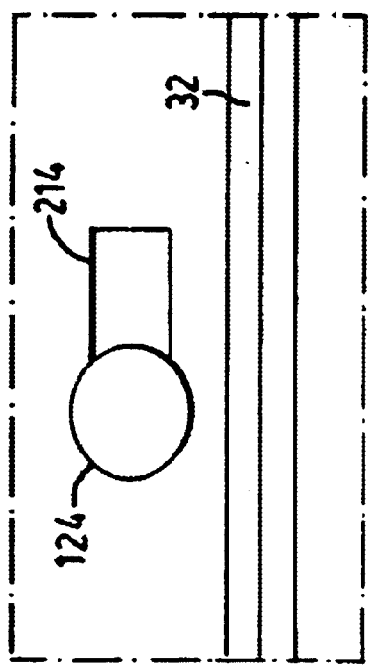
FIG. 11B Is an enlarged view of a rod and a slot defined by a reflector.
Figure 11C:
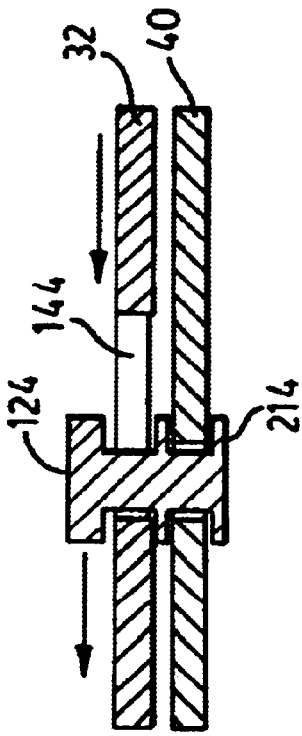
FIG. 11C is a cross-sectional view illustrating a rod extending through a slot in a reflector and a slot in a socket plate.
Figure 11A:
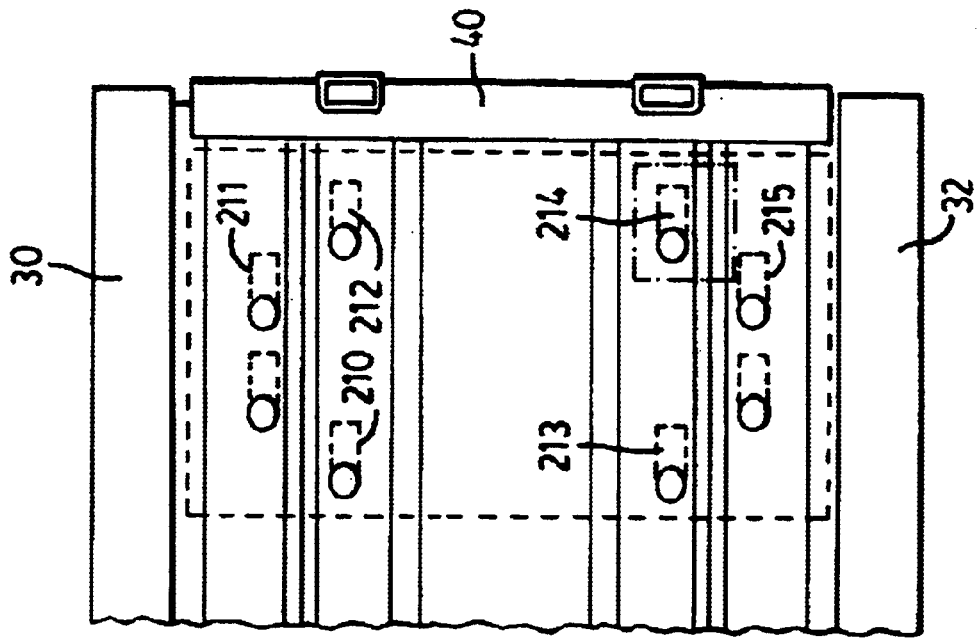
FIG. 11A is a downward view, from the perspective of the user, of a portion of the fluorescent lighting fixture.

In a third embodiment, the reflectors 30 and 32 have a plurality of slots 140, 141, 142, 150, 151, 152 and 143, 144, 145, 153, 154, 155 respectively (as shown in FIG. 2) and the first and second socket plates 40, 50 also have a plurality of slots 160, 161, 162, 163, 164, 165 and 170, 171, 172, 173, 174, 175 respectively (as shown in FIG.4). Reflectors 30 and 32 are slidably mounted onto the bottom surface of the first socket plate 40 and the second socket plate 50 (as shown in FIG.11A. 11B, and 11C) in the same fashion as described in the first embodiment.

The retrofit can be adapted such that fewer or more fasteners, slots and holes then described above are needed to movably mount the reflectors onto the socket plates. There may be as few as two mutual attachment points on the each the reflectors and sockets. It will also be appreciated that the locations of the slots, holes, and fasteners can be varied.

Gaps exists between the heads of the fasteners 120, 121, 122, 123, 124, 125, 126, 127, 128, 129, and 130 the top surface of the reflectors 30 and 32 thereby allowing the reflectors 30 and 32 to float above the socket plates 40 and 50. FIG. 2A shows the gap 190 between the head 120A of fastener 120 and reflector 30. This gap facilitates a slidable relation between the socket plates and the reflectors. It will be appreciated that other configurations can allow a slidable relation between the socket plates and the reflectors. For example the socket plate could be configured to have a rail in parallel with the reflector, the rail received by a grove in the reflector in a secured but slidable relation. Alternatively, the reflector could be configured to have a rail in parallel with the reflector, the rail received by a grove in the socket plate in a secured but slidable relation As shown in FIG. 12A and FIG. 12B. the length of tie retrofit 10 can expand and contract by moving the socket plates 40 and 50 in the horizontal plane, towards each other and away from each other, respectively. The amount of expansion and contraction correlates with the size of the slots 140, 141, 142, 143, 144, 145, 150, 151, 152, 153, 154, 155, 160, 161, 162, 163, 164, 165, 170, 171, 172, 173, 174, 175. Typically, the slots will enable the retrofit 10 to expand or contract approximately 23.5 mm.

As shown in FIG. 4, the retrofit includes attachments on the top side of the retrofit 10. A plurality of attachments 92, 94, 96, 98, and attachments 100, 102, 104, and 106 are attached to the top surface of first socket plate 40 and second socket plate 50 respectively. Preferably, the attachments 92, 94, 96, 98, 100, 102, 104, 106 will be the kind which comprise of two inner, corresponding, mating surfaces and which have a coating of adhesive on the outer, non-mating surfaces. The attachments 92, 94, 96, 98, 100, 102, 104, 106 allow the retrofit 10 to be temporarily held in place and easily repositioned within an empty lighting fixture shell. Suitable attachment means include hoop and loop type fasteners (i.e. Velcro™) and dual loop type fasteners (i.e. Dual Lock™) Alternatively magnets can be attached to the top surface of the first socket plate 40 and second socket plate 50. Other attachment means will be known to those skilled in the art. It will also be appreciated that the locations of the attachments and the number of attachments used can be varied.

The retrofit 10 is provided to the end user fully assembled with the reflectors 30 and 32 movably mounted onto socket plates 40 and 50 and with the ballast 70 and lamp sockets pre-wired. The retrofit can also be provided with protective shrink wrap on the reflectors 30 and 32. The shrink wrap protects the surfaces of the reflectors 30 and 32 during installation.

In use, starting with an empty lighting fixture shell, the first step in installing the retrofit 10 is to remove the ballast cover 20 from the retrofit 10 thereby exposing the socket plates 40, 50.

Where the retrofit is outfitted with either hoop and loop fasteners or dual loop fasteners, the installer then peels the backings from the attachment 92, 94, 96, 98, and attachment means 100, 102, 104, and 106 to reveal the adhesive. The installer, by sliding the socket plates 40 and 50 together, contracts the retrofit 10 and inserts the retrofit into the lighting fixture shell. Once in the lighting fixture shell, the installer can expand the retrofit 10 by sliding the socket plates 40 and 50 away from each other in order that the retrofit 10 is fitted snugly into the lighting fixture shell.

The retrofit is held in place in the lighting fixture shell by the attachment 92, 94, 96, 98, 100, 102, 104, and 106. It is not necessary for the installer to hold the retrofit 10 in place; therefore the installer is permitted to use both hands to perform the remaining installation steps.

If desired or needed, the retrofit 10 can be repositioned by pulling the retrofit 10 out of the lighting fixture shell and thereby separating the mating surfaces of the attachments 92, 94, 96, 98, 100, 102, 104, 106 and leaving one half of the attachments 92, 94, 96, 98, 100, 102, 104, 106 adhered to the lighting fixture shell. The retrofit 10 can then be repositioned in the lighting fixture shell and the attachments 92, 94, 96, 98, 100, 102, 104, 106 re-mated securing the retrofit 10 in place.

Where the retrofit is 10 outfitted with magnets rather than hoop and loop fasteners or dual loop fasteners, the retrofit is held in the fixture shell magnetically and can be repositioned by simply pulling the retrofit 10 out of the fixture shell and replacing the retrofit 10 within the fixture shell.

Once the installer is satisfied with the placement of the retrofit 10 within the lighting fixture shell, the retrofit 10 is more securely held in place with the installation of screws 180, 181 and 182 which pass through screw hole 230 in socket plate 40 and screw holes 231 and 232 in socket plate 50 respectively.

The installer than connects the third set of wiring 86 from the ballast 70 to a power supply. The ballast cover 20 is then snapped into place between the reflectors 30 and 32. The protective shrink wrap covering is then removed from the reflectors 30 and 32 and ballast cover 20.

Fluorescent lamps are then fitted into the lamp sockets 60, 62, 64, 66. The existing fixture lens from the retrofitted light fixture is then replaced, concealing retrofit 10 from view.

The conversion is now complete. Starting with an empty lighting fixture shell, installation of the retrofit takes approximately 6 minutes to complete.

The foregoing is a description of preferred embodiments of the invention which is given here by way of example only. The invention is not to be taken as limited to any of the specific features as described, but comprehends all such variations thereof as come with the scope of the appended claims.

What is claimed is:

1. A fluorescent light fixture comprising:
   a first socket plate;
      said first socket plate having a top surface and a bottom surface;
   a second socket plate;
      said second socket plate having a top surface and a bottom surface;
   a lamp socket mounted to the bottom surface of the first and second socket plates;
   a reflector extending lengthwise;
   wherein the first arid second socket plates are located at opposite ends of the reflector and wherein said reflector is attached to said first socket plate such that it is adjustable lengthwise in relation to said socket plates.

2. A fluorescent light fixture comprising:
   a first socket plate;
      said first socket plate having a top surface and a bottom surface;
      said first socket plate having a slot therein;
   a second socket plate;
      said second socket plate having a top surface and a bottom surface;
   a lamp socket mounted to the bottom surface of the first and second socket plates;
   a reflector extending lengthwise having a hole therein, said hole alignable with said slot;
   said reflector fastened to the bottom surface of each of the first socket plate and the second socket plate, wherein the first and second socket plate are located at opposite ends of the reflector;
   a rod extending through said hole and said slot, wherein said first socket plate is adjustable lengthwise in relation to said reflector.

3. A fluorescent fixture according to claim 2 wherein the second socket plate has a second slot therein and wherein a rod passes through the second hole in the reflector and the second slot in the second socket plate and wherein said second socket plate is slidable in relation to said reflector.

4. A fluorescent fixture according to claims 2 wherein the rods are rivets.

5. A fluorescent light fixture comprising:
   a first socket plate;
      said first socket plate having a top surface and a bottom surface;
      said first socket plate having a hole therein;
   a second socket plate;
      said second socket plate having a top surface and a bottom surface;
   a lamp socket mounted to the bottom surface of the first and second socket plates;
   a reflector having a slot therein, said slot alignable with said hole;
   said reflector fastened to the bottom surface of each of the first socket plate and the second socket plate, wherein the first and second socket plate are located at opposite ends of the reflector;
   a rod extending through said hole and said slot, wherein said first socket plate is slidable in relation to said reflector.

* * * * *